United States Patent [19]

Foster

[11] 4,394,367

[45] Jul. 19, 1983

[54] PROCESS FOR RECOVERY OF CHLORINE FROM HYDROGEN CHLORIDE

[75] Inventor: Elton G. Foster, Houston, Tex.

[73] Assignee: Shell Oil Co., Houston, Tex.

[21] Appl. No.: 357,031

[22] Filed: Mar. 11, 1982

[51] Int. Cl.³ .............................................. C01B 7/04
[52] U.S. Cl. .................... 423/502; 423/240; 423/241; 423/507
[58] Field of Search ............... 423/500, 502, 507, 240, 423/241

[56] References Cited

U.S. PATENT DOCUMENTS

| | | | |
|---|---|---|---|
| 2,299,427 | 10/1942 | Rosenstein | 423/502 |
| 2,395,314 | 2/1946 | Blumer | 423/502 |
| 2,448,255 | 8/1948 | De Benedictis et al. | 423/502 X |
| 2,542,961 | 2/1951 | Johnson et al. | 423/502 |
| 2,644,846 | 7/1953 | Johnson et al. | 423/507 X |
| 2,746,844 | 5/1956 | Johnson et al. | 423/507 X |
| 2,841,243 | 7/1958 | Hooker et al. | 423/240 X |
| 2,855,279 | 10/1958 | Walter | 423/507 |
| 3,201,201 | 8/1965 | Van Dijk et al. | 423/502 |
| 3,210,158 | 10/1965 | Engel et al. | 423/502 |
| 3,233,978 | 2/1966 | Alkemade | 423/488 |
| 3,260,678 | 7/1966 | Engel et al. | 423/502 X |
| 3,483,136 | 12/1969 | van der Plas et al. | 423/502 X |

Primary Examiner—Earl C. Thomas
Attorney, Agent, or Firm—Ronald R. Reper

[57] ABSTRACT

This invention relates to improvements in the execution of catalytic processes wherein chlorine in high state of purity is produced by reacting hydrogen chloride containing organic impurities with oxygen.

6 Claims, 1 Drawing Figure

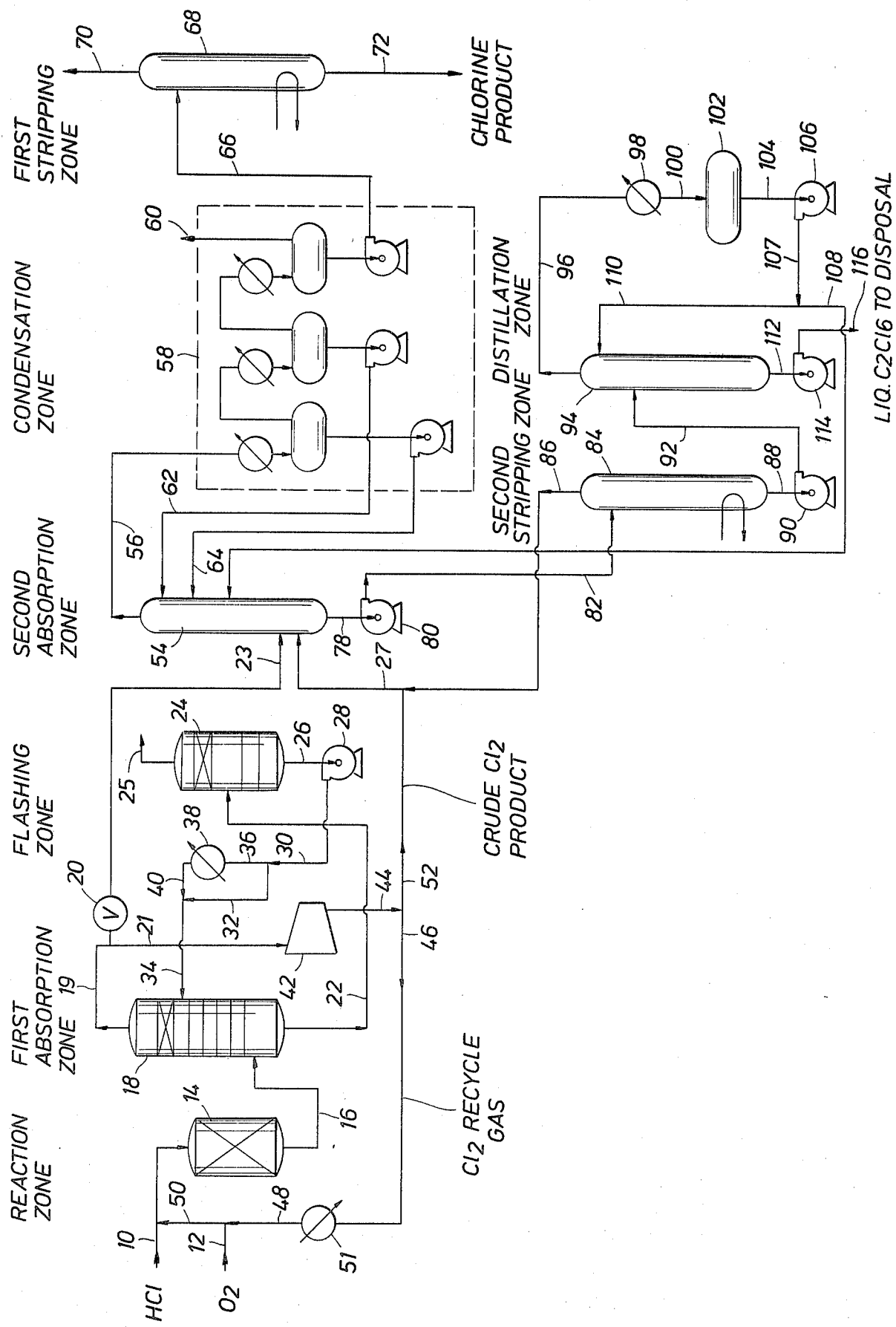

PROCESS FOR RECOVERY OF CHLORINE FROM HYDROGEN CHLORIDE

BACKGROUND OF THE INVENTION

This invention relates to improvements in the production of chlorine by catalytic oxidation of hydrogen chloride. This invention relates more particularly to improvements in the manufacture of chlorine by the oxidation of hydrogen chloride containing small amounts of organic impurities and is particularly suitable for the production of chlorine from hydrogen chloride in the presence of a chloride of a metal having an atomic number of from 21 to 30 inclusive.

Hydrogen chloride is formed as a by-product in a number of important industrial processes such as the manufacture of freon gases, vinyl chloride monomer, tolylene diisocyanate and the like. However, such hydrogen chloride often contains organic impurities, complicating its reuse, or ultimate disposal. Over the years a number of processes have been proposed for recovery of chlorine from the hydrogen chloride by oxidation with an oxygen-containing gas. U.S. Pat. No. 2,855,279 relates a process for oxidizing liquid hydrochloric acid using a nitrogen dioxide type catalyst wherein nitrogen dioxide and moisture are removed from the reaction product by scrubbing with sulfuric acid. Unreacted oxygen is then separated by venting after absorption of the chlorine product into carbon tetrachloride at 40-500 psig. The chlorine is recovered in gaseous form by release of the pressure to 10-30 psig. The carbon tetrachloride is then recompressed and recycled to again absorb chlorine. Other processes are described, for example, in U.S. Pat. Nos. 2,299,427; 2,448,255, 2,542,961; 2,644,846; 2,746,844; 3,201,201; 3,210,158; 3,242,648; and 3,260,678.

As is known, for example, from U.S. Pat. No. 3,233,978 organic impurities in the hydrogen chloride being oxidatively converted to chlorine are themselves typically converted to halohydrocarbons such as carbon tetrachloride and hexachloroethane. The latter compound is a particular problem owing to its high melting point of 187° C. (368° F.) and its tendency when condensed, particularly into aqueous systems, to adhere to and foul conventional solids separation equipment, heat exchange equipment and the like. This tendency for fouling is disruptive of efficient continuous operations. Thus it is readily apparent that there exists a need for an improved process to efficiently convert hydrogen chloride containing impurities to chlorine, while avoiding disruptive fouling during operations.

The improvements of the invention provides such a process.

SUMMARY OF THE INVENTION

According to the invention, there is provided a process wherein chlorine is produced by contacting oxygen and hydrogen chloride and minor amounts of organic impurities in the presence of a chloride of a metal having an atomic number of 21 to 30, both inclusive, at hydrogen chloride oxidizing conditions in a reaction zone thereby forming a reaction mixture comprising chlorine, hydrogen chloride, water, carbon dioxide and impurities, which process comprises (a) contacting said reaction mixture in a first absorption with zone with sulfuric acid having a temperature lower than the temperature of the reaction mixture exiting the reaction zone to partially cool and to dry said reaction mixture;

(b) contacting the partially cooled reaction product from step (a) in a second absorption zone with carbon tetrachloride thereby absorbing in said carbon tetrachloride substantially all of the hydrocarbonaceous products and a small amount of the chlorine contained in said partially cooled reaction product;

(c) cooling the unabsorbed product from step (c) in a condensing zone thereby forming in said condensing zone a liquid phase consisting essentially of chlorine and hydrogen chloride, and a vapor phase consisting essentially of unreacted oxygen, carbon dioxide and hydrogen chloride;

(d) passing at least part of said vapor phase from step (c) to said reaction zone;

(e) stripping said liquid phase from step (c) in a first stripping zone to remove as overhead hydrogen chloride and removing chlorine as bottom product;

(f) stripping said absorption product from step (b) in a second stripping zone to remove chlorine as an overhead stream and leaving a bottom product comprising carbon tetrachloride and impurities which originated from the reaction zone;

(g) distilling by fractionation distillation said bottoms product from step (f) in a distillation zone to recover carbon tetrachloride as overhead product, said distillation zone being operated at a pressure sufficient to remove said impurities as a liquid bottoms product.

BRIEF DESCRIPTION OF THE DRAWING

The FIGURE is a schematic flowsheet of a preferred embodiment of the invented process.

The major process steps shown in the drawing include: a reaction zone for oxidizing the hydrogen chloride and any organic impurities that may be present, a first absorption zone (sulfuric acid scrubber) for cooling and dehydrating the reaction product, a flashing zone (sulfuric acid flasher) for dehydrating and cooling the sulfuric acid used in the sulfuric acid scrubber, a second absorption zone (carbon tetrachloride scrubber) for removal of the reaction products of the organic impurities entering with the hydrogen chloride feed, a chlorine condensation zone for condensing the chlorine product, a first stripping zone for removal of hydrogen chloride from the condensed chlorine product, a second stripping zone for removal of chlorine from the fat absorbate from the second absorbtion zone, and a distillation zone for separation as overhead the carbon tetrachloride from the heavy conversion residue resulting from the original organic impurities introduced with hydrogen chloride.

DESCRIPTION OF THE PREFERRED EMBODIMENTS

Referring now in more detail to the embodiment of the invention drawn in the FIGURE, hydrogen chloride which may contain minor amounts, e.g. up to about 5%w of organic impurities such as $C_1$-$C_4$ hydrocarbons, via line 10 and oxygen via line 12 is fed to chlorine reaction zone 14. The hydrogen chloride and oxygen are reacted in a chlorine reactor in the presence of a fixed bed or fluidized bed catalyst according to well known processes at elevated temperatures to produce chlorine and water. Preferably, the amount of oxygen is in slight excess of stoichiometric ratio. Pressure in the chlorine reactor typically is between 0.1 and 100 psig and temperature between 300° C. and 650° C. The catalyst is suitably a chloride of a metal of the first transition series of elements in the periodic table, that is chlorides of a metal having an atomic number of from 21 through 30, both inclusive. Thus, suitable metals comprise titanium, vanadium, chromium, manganese, iron, cobalt, nickel and copper. Of these metals, iron and copper are preferred.

The metal chloride employed may be used as such but preferably will comprise a suitable support or diluent material such as adsorbtive materials of siliceous and/or aluminous character and of synthetic or natural origin. Preferred diluent or support materials comprise alumina, silica, magnesia, silica alumina and the like. Exemplary catalysts are described for example in U.S. Pat. No. 2,542,961, U.S. Pat. No. 3,210,158 and U.S. Pat. No. 3,483,136. If desired, the oxidation reaction may be conducted in the presence of an organic chlorine acceptor such as an olefinic hydrocarbon, introduced into the reactor (not shown in drawing) as described in U.S. Pat. No. 2,746,844. The reactor design is preferably one permitting recirculation of the reactants for increased contact with the catalyst, e.g. by use of one or more turbines, eductors or other mixing devices. The reaction zone may be any of upflow, downflow or horizontal flow as desired. The temperature within the reaction zone is maintained in the range of from about 300° C. to about 600° C. and preferably from about 300+ C. to 400° C. Since the reaction is highly exothermal, generally no external application of heat is necessary. The hydrogen chloride gas comprised predominantly of hydrogen chloride which may contain minor amounts of organic impurities in admixture with oxygen or an oxygen-containing gas such as air results in the production of reaction products containing chlorine and water. The process may be represented by the basic equation

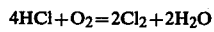

$$4HCl + O_2 = 2Cl_2 + 2H_2O$$

A particular advantage of the invention resides in its ability to employ efficiently relatively pure oxygen.

Reaction effluent comprising chlorine, water, and unconverted hydrogen chloride together with minor amounts of carbon oxides and halogenated organic compounds is taken from the reaction zone and passed via line 16 to a first absorption zone 18. Within the first absorption zone the reaction effluent is brought into direct contact, preferably by counter current contact, with liquid sulfuric acid having a lower temperature, preferably below about 260° C. and more preferably below about 205° C. thereby separating a cooled dried gaseous product via line 19 and a sulfuric acid stream containing sorbed water.

The sulfuric acid containing sorbed water and at least the heat of sorption, together with the heat of reaction from the cooled reaction effluent gases is removed from the first absorption zone via line 22. Said acid may conveniently be regenerated under adiabatic conditions by flashing in one or more stages under reduced pressure in flashing zone 24. The flashing operation utilizes the increased heat content of the water-rich sulfuric acid to effect flashing, which then serves to both regenerate (dehydrate) and cool the sulfuric acid which is then recycled via line 26, pump 28 and lines 32 and 34 to first absorption zone 18. Supplemental cooling of the regenerated sulfuric acid removed from flashing zone 24 may be provided by circulating at least a portion of the acid flowing through line 30 via lines 36, cooling exchanger 38 and lines 40 and 34 to the first absorption zone 18. The flashed water vapor and uncondensables such as nitrogen and oxygen are withdrawn from zone 24 by means of line 25 operatively connected to a vacuum source such as a stream jet—condensor system, and vented to the atmosphere. More detailed description of the operation of the first absorption zone and the flashing zone may be found in U.S. Pat. No. 3,201,201 incorporated herein by reference.

The effluent gases from the first absorption zone are passed via lines 19, 20 and 23 to second absorption zone 54. In a preferred embodiment at least a portion of said effluent gases exiting the first absorption zone are passed via lines 19 and 21 and pressurized via compressor 42. After exiting the compressor via line 44 a portion of the crude chlorine product is recycled via lines 46, 48, 50 and 10 to reaction zone 14. Use of recycle stream to the reaction zone not only promotes mixing of the wet corrosive gases in the reaction zone, it provides cooling as well. A further advantage is that recycle of the dry chlorine permits a higher ultimate chlorine concentration to be obtained because reduction of water in the reaction zone environment shifts the equilibrium toward greater chloride conversion. As a result less refrigeration is required to condense the remainder of the crude chlorine product as will be hereinafter described. Additional cooling of the recycled chlorine stream may be provided by indirect heat exchanger 51 shown between lines 46 and 48.

If desired, a portion of the crude chlorine may be passed from compressor 42 via lines 44 and 52 to second absorption zone 54. In said zone, the crude chlorine is contacted with carbon tetrachloride at a temperature between about 50° C. and 80° C. thereby separating via line 56 an overhead stream containing chlorine gas, hydrogen chloride and very minor amounts of unconsumed oxygen, and oxides of carbon. The overhead stream 56 is passed to condensation zone comprising at least one stage of refrigeration cooling to condense the chlorine and major amount of chlorine gas. Uncondensable gases substantially comprising oxygen, carbon oxides and small amounts of hydrogen chloride are vented via line 60 for further purification, if necessary, and disposal. For greater energy efficiency, and to knock back $CCl_4$ and heavier impurities, a portion of the condensate from interstage condensation in cooling zone 58 may be recycled to the top of second absorption zone 54 via lines 62 and 64. The product from condensation zone 58 is passed in a line 66 to first stripping zone 68 where hydrogen chloride is removed as overhead via line 70 and, optionally, recycled to reaction zone via a line not shown. Chlorine product is passed as bottoms product from said first stripping zone 68 via line 72.

From second absorption zone 54 a fat absorbate bottom stream comprising carbon tetrachloride, the converted organic impurities which exited the first absorption zone and a minor amount of chlorine is passed via line 78, pump 80 and line 82 to second stripping zone 84 where the entrained chlorine is thermally stripped. The stripped chlorine is removed as an overhead stream and is passed via lines 86 and 27 to the second absorption zone 54. Bottoms from the second stripping zone is passed via line 88, pump 90 and line 92 to a distillation zone 94 for removal of the organic impurities such as $C_2Cl_6$ from the carbon tetrachloride. The distillation zone 94 may comprise one or more columns, but preferably is a single column having more than 2 theoretical plates of separation efficiency. It is operated at a temperature from about 100° C. at the top of the column to about 200° C. at the bottom of the column, and superatmospheric pressure as desired, preferably in the range from about 1.1 to about 30 bar and particularly from about 1.4 to about 3 bar. Accordingly, carbon tetrachloride absorbent is removed as overhead via lines 96, cooler 98, line 100, accumulator 102, line 104, pump 106 and lines 107 and 108 to second absorption zone 54. A portion of the cooled carbon tetrachloride is returned to distillation zone 94 as reflux to enhance distillation efficiency. Organic impurities, in particular, hexachloroethane, are withdrawn from distillation zone 94 as a liquid bottoms stream via line 112, pump 114 and line 116 for further use, or ultimate disposal. An advantage of the instant process is that the organic impurities, particularly hexachlorethane, are separated as a liquid stream in contrast to other processes wherein these materials have been separated as adherent difficult to filter solids having a tendency to plug removal equipment and disrupt continuous operations.

EXAMPLE

The following example is exemplary and based upon calculations for a 100 metric ton per day chlorine plant. The condensed feed to the oxidation zone comprise a ratio of 2 pound moles of hydrogen chloride to one pound mol of oxygen gas which are reacted at a temperature of about 400° C. and pressure of about 7 bar in the presence of a catalyst comprising chlorides of copper, alkali metal and a rare earth on a silica support such as described in U.S. Pat. No. 3,483,136. About 333 moles of hydrogen chloride per hour and about 66.8 mols of 99.5% pure oxygen are injected into the reactor.

About 75 percent of the hydrogen chloride is converted to chlorine gas in the reactor. From the reactor effluent gas comprises chlorine, hydrogen chloride, water, unreacted oxygen, very minor amounts of nitrogen originating as impurity with the oxygen, organic chlorides originating from the original impurities and carbon oxides (oxidized organic impurities). The reactor effluent gases having a temperature of about 400° C. are injected into the bottom of a corrosion resistant upright contactor having one or a plurality of packed beds and are contacted countercurrently with about 93 percent sulfuric acid having a temperature of about 43° C. to simultaneously dry the effluent gases and cool them to about 205° C. The sulfuric acid after contact with the effluent gases having a concentration of about 91 percent and a temperature of about 205° C. is passed to one or more stages of flashing at a pressure in the range from about 80 to 30 mm under adiabatic conditions in order to remove the sorbed water as vapor and to partially cool the acid e.g., to about 175° C. The acid is then further cooled by indirect heat exchange to about 110° C. and is then recycled to the first absorbing zone. The water flashed with inert gases such as carbon dioxide, nitrogen and oxygen may be condensed, if desired, e.g. by means of a barometric condenser, or vented with the inerts from the system. The dried reactor effluent is withdrawn from the sulfuric acid contacting zone and is compressed to about 10 bar and a minor portion i.e., from about 10 to about 45% is recycled to the reaction zone to promote mixing and provide cooling for the exothermic reaction of the hydrogen chloride with oxygen.

The remainder of the first absorption zone effluent (crude chlorine product) is passed to a second absorption zone where it is contacted countercurrently with carbon tetrachloride. The second absorption zone, which may be a tower having a corrosion resistant lining and containing one or a plurality of trays, grids or the like, or packed with e.g., ceramic saddles, carbon tetrachloride having a temperature of about 30° C. to about 60° C. countercurrently contacts the crude chlorine product to both remove organic chloride impurities, such as $C_2Cl_6$, and cool said product which is then removed from the top of the second absorption column at about 30° C. The cooled crude chlorine product is then subjected to further cooling stages to a temperature of about $-20°$ C. to condense the chlorine. A portion of the initial condensate is returned to the top of the second absorption zone as reflux. Uncondensed gases are recycled to the reaction zone after heat exchange (not shown) to recover their refrigeration capacity. The liquid chlorine is passed to a first stripping zone to thermally strip any hydrogen chloride which is removed as overhead and recycled to the reaction zone. Liquid chlorine product is removed as a bottoms product from the first stripping zone.

Carbon tetrachloride containing organic chlorides is removed as bottom product from the second absorption zone and is passed to a second stripping zone to thermally strip any absorbed chlorine gas. Such stripped chlorine is removed as overhead and recycled to the second absorption zone. Effluent from the second stripping zone is withdrawn as bottoms, and fed to a distillation column. In the distillation column, which is operated at a temperature of about 100° C. at the top of the column, and 200° C. at the top of the column, and 200° C. at the bottom, and a pressure of at least about 1.1 bar absolute, carbon tetrachloride is recovered as an overhead product, for recycle to the second absorption zone.

Liquid organic chlorides are removed as bottoms product for further use, or disposal.

I claim:

1. In a process wherein chlorine is produced by contacting oxygen and hydrogen chloride and minor amounts of organic impurities in the presence of a chloride of a metal having an atomic number of 21 to 30, both inclusive, at hydrogen chloride oxidizing conditions in a reaction zone thereby forming a reaction mixture comprising chlorine, hydrogen chloride, water, carbon dioxide and halogenated impurities, the steps which comprise (a) contacting said reaction mixture in a first absorption with zone with sulfuric acid having a temperature lower than the temperature of the reaction mixture exiting the reaction zone to partially cool and to dry said reaction mixture;

(b) contacting the partially cooled reaction product from step (a) in a second absorption zone with carbon tetrachloride thereby absorbing in said carbon tetrachloride substantially all of the halogenated impurities and a small amount of the chlorine contained in said partially cooled reaction product;

(c) cooling the unabsorbed product from step (b) in a condensing zone thereby forming in said condensing zone a liquid phase consisting essentially of chlorine and hydrogen chloride, and a vapor phase consisting essentially of unreacted oxygen, carbon dioxide and hydrogen chloride;

(d) stripping said liquid phase from step (c) in a first stripping zone to remove as overhead hydrogen chloride and removing chlorine as bottom product;

(e) stripping the absorption product from step (b) in a second stripping zone to remove chlorine as an overhead stream and leaving a bottom product comprising carbon tetrachloride, and impurities which originated from the reaction zone; and (f) distilling by fractional distillation said bottoms product from step (e) in a distillation zone to recover carbon tetrachloride as overhead product, said distillation column being operated at a pressure sufficient to remove said impurities as a liquid bottoms product.

2. A process as in claim 1 wherein intermediate to steps (a) and (b) a portion of the partially cooled product of step (a) is compressed and passed to the reaction zone to promote cooling in said reaction zone.

3. A process as in claim 1 wherein step (a) the sulfuric acid is at a temperature below about 260° C.

4. A process as in claim 1 wherein step (d) the stripped HCl is recycled to the reaction zone.

5. A process as in claim 1 wherein step (f) the pressure in the distillation zone is at least about 1.1 bar absolute.

6. A process as in claim 5 wherein step (f) the pressure in the distillation zone is in the range from about 1.4 to about 3 bar.

* * * * *